United States Patent [19]

Johnson et al.

[11] Patent Number: 4,494,900
[45] Date of Patent: Jan. 22, 1985

[54] FLEXIBLE DISK SORTER SLIDE APPARATUS

[75] Inventors: Ronald R. Johnson, Shorewood; James A. Melville, St. Louis Park; Richard D. Schuelke, Eden Prairie, all of Minn.

[73] Assignee: IXI Laboratories, Inc., Shorewood, Minn.

[21] Appl. No.: 486,707

[22] Filed: Apr. 20, 1983

[51] Int. Cl.³ .............................................. B65G 57/16
[52] U.S. Cl. ....................................... 414/27; 193/47; 198/406; 360/133; 414/86
[58] Field of Search ...................... 414/27, 86; 193/44, 193/47, 48; 198/406; 360/88, 133

[56] References Cited

U.S. PATENT DOCUMENTS 2,776,034  1/1957  Jordt ....................................... 193/47
4,195,321  3/1980  Chelin et al. ........................... 360/98
4,302,141  11/1981  Miguel ................................. 193/47 X

FOREIGN PATENT DOCUMENTS 684661  4/1964  Canada ................................. 414/119
1330466  9/1973  United Kingdom .................. 414/27

*Primary Examiner*—Leslie J. Paperner

[57] ABSTRACT

Sorter slide apparatus for disk jacket combinations that include a slide extended into a bin of a sorter for receiving such combinations as they are discharged into a bin and conveying them to a removable box of a magazine. The disk combinations in being moved to be discharged into a bin have their open rear flaps in advance of the remainder of the jacket, and when discharged fall onto the upper part of the slide to slide downwardly and transversely while the upper slide portion supports them to be inclined downwardly both in longitudinal and transverse directions. The transverse intermediate portion of the slide has edges to cause the combinations to swingingly rotate through an angle of about 90° whereby the opened flap faces toward the bin. The disk combination in moving off the slide move over the top of a pole pin and have the edges opposite the rear flaps abut against the web of a bracket that is pivotally connected to the lower end portion of the slide or the front wall of the box so that the disks will move relative the jackets whereby the drive openings of the disks and jackets become substantially concentric relative to one another in the event they are not substantially concentric.

20 Claims, 9 Drawing Figures

U.S. Patent  Jan. 22, 1985  Sheet 1 of 2  4,494,900
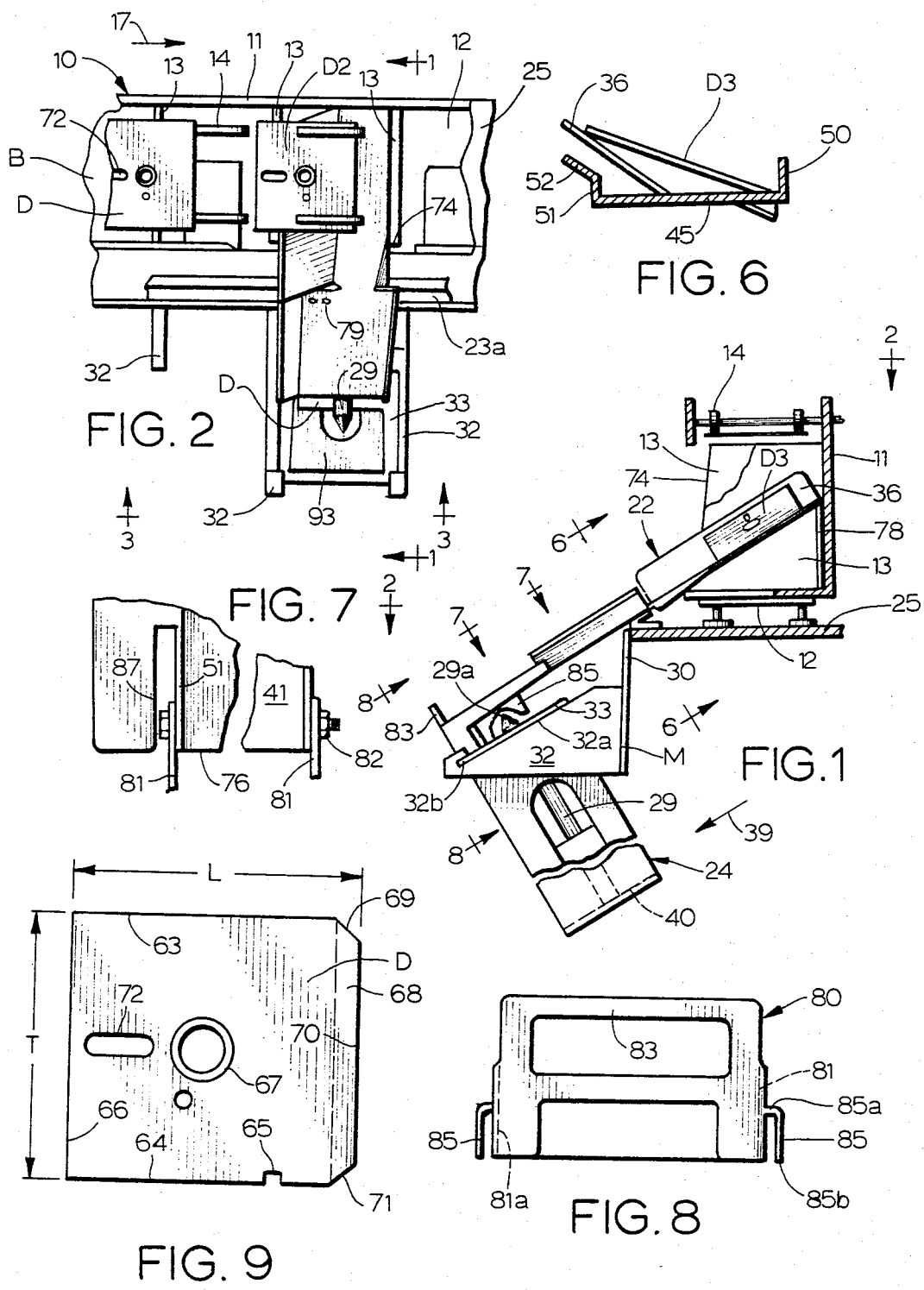

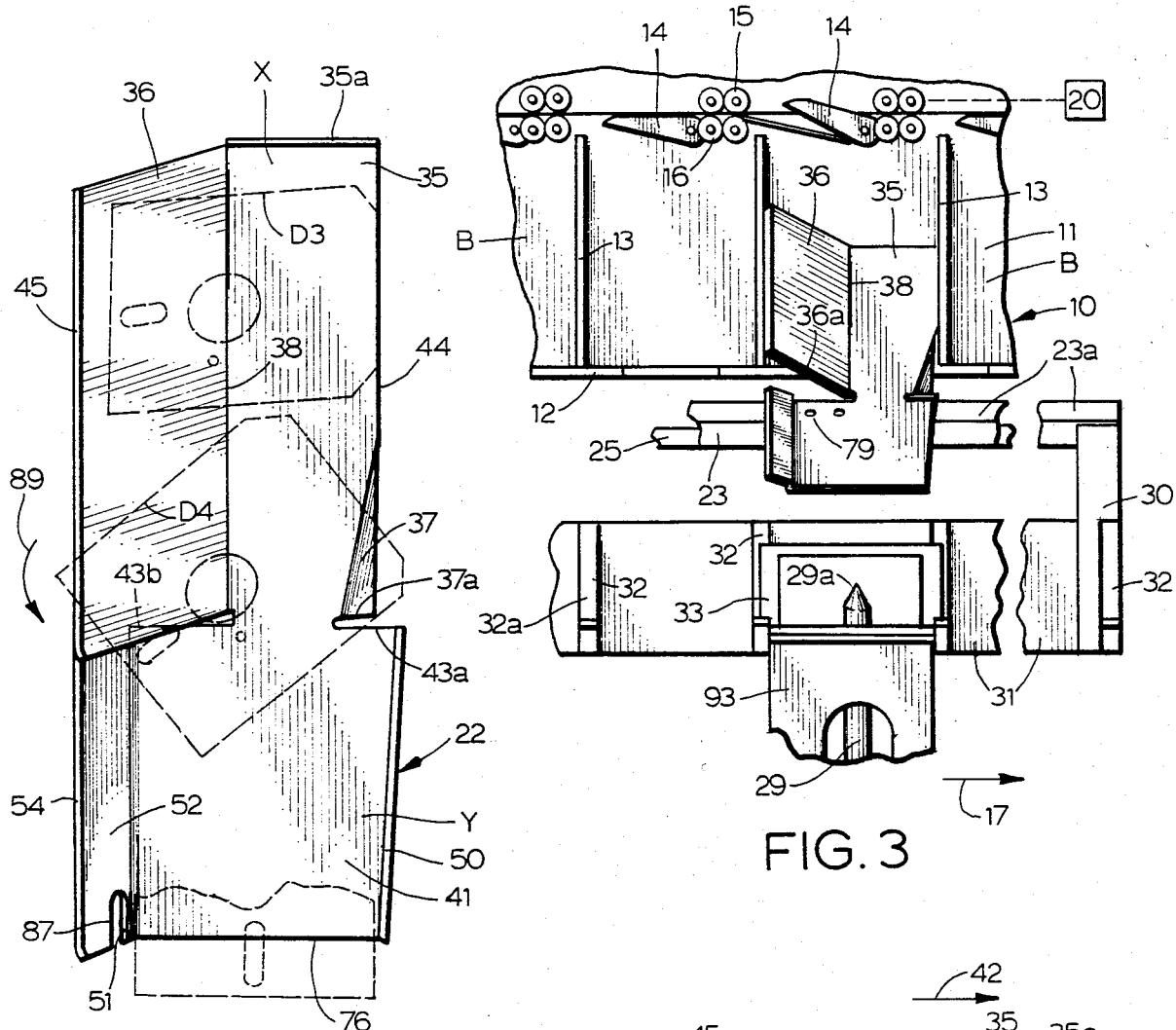

FLEXIBLE DISK SORTER SLIDE APPARATUS

BACKGROUND OF THE INVENTION

In processing magnetic floppy disks with their rear jacket open through sorters into bins, for example such as disclosed in U.S. Ser. No. 402,841, filed July 28, 1982 at times the disk drive openings do not remain centered (concentric) with reference to the jacket drive openings. Also such problems are encountered when transferring such disk jacket combinations into storage containers. In order to provide relatively simple mechanism that will rotate a disk jacket combination while conveying it under gravity from a bin to a container of a magazine to abut against a stop or container front wall and descent relative a pole pin so that the disk and jacket relatively move to have their drive openings become substantially concentric, this invention has been made.

SUMMARY OF THE INVENTION

A slide for receiving a floppy disk jacket combination or the like from a sorter assembly that propells the combination in a longitudinal direction with the jacket flap leading, and conveying the received combination in a transverse direction under gravity to a storage container. The slide assembly has an upper portion for slidably supporting the assembly to be inclined downwardly in both longitudinal and transverse directions, and a lower portion that engages an edge of the jacekt as the jacket moves off the upper portion to turn the jacket through an angle of about 90° and direct the jacket into a storage container with the flap trailing as the disk combination moves off the slide.

An object of this invention is to provide new and novel slide means for conveying a floppy disk jacket combination or the like to a storage box and retarding the travel of part of the combination so that the combination turns through an angle of about 90° prior to moving off the slide. A further object of this invention is to provide new and novel slide means for receiving floppy disk jacket combinations having opened unbent flaps from a sorter assembly and slidably support the combinations to rotate them through an angle of about 90° and direct them into a box so that as to any of the disk combinations that have disk drive openings out of substantially concentric relationship to the jacket drive openings, the disks move relative to the jackets to become substantially concentric and the combinations descend in the box with the pole pins extending through the drive openings. In furtherance of the last mentioned object, it is another object of this invention to provide new and novel bracket means attached to the slide means to prevent disk jacket combinations overshooting the box as they move off the slide means and that is movably relative the box to avoid interference with the removal of the box from a magazine frame.

BRIEF DESCRIPTION OF THE DRAWINGS

FIG. 1 is a side view of the slide and bracket assembly of this invention shown in a position for directing disk jacket combinations from a sorter into a magazine, said view being generally taken along the line and in the direction of the arrows 1—1 of FIG. 2;

FIG. 2 is a plan view of the slide assemby and also shows portions of the sorter and magazine; said view being generally taken along the line and in the direction of the arrows 2—2 of FIG. 1;

FIG. 3 is a front view generally taken along the line and in the direction of the arrows 3—3 of FIG. 2;

FIG. 4 is a perspective view of the slide assembly;

FIG. 5 is a plan view of the slide assembly inclined at the angle of its position of use and in dotted lines shows various positions of a floppy disk jacket as it is conveyed from a sorter bin to a magazine box;

FIG. 6 is a cross sectional view of the slide assembly that is generally taken along the line and in the direction of the arrows 6—6 of FIG. 1;

FIG. 7 is a fragmentary plan view showing the bracket assembly legs pivotally connected to the slide assembly with a longitudinal intermediate portion of the slide assembly broken away, said view being generally taken along the line and in the direction of the arrows 7—7 of FIG. 1;

FIG. 8 is a front view of the bracket assemby that is generally taken along the line and in the direction of the arrows 8—8 of FIG. 1; and FIG. 9 is a plan view of a floppy disk jacket combination.

Referring now in particular to FIGS. 1-3, there is shown a portion of a sorter machine, generally designated 10, that includes bins B that are in part defined by side walls 13, an end wall 11 and a bottom wall 12. Flippers (fingers) 14 and roller assemblies 15, 16 are provided for supporting and moving the floppy disk and jacket combinations D, or the like in the longitudinal direction of arrow 17 and upon the operation of the fingers 14, direct a disk combination D into the desired bin. Other than the parts of the sorter shown, the structure for mounting the roller assemblies and flippers, operating the flippers and driving at least one set of roller assemblies to propel the disk jacket combinations has been indicated by box 20. Since sorters of varying conventional constructions can be used, and the sorter that is in part shown herein has been described in greater detail in said copending application Ser. No. 402,841 it will not be further described herein, said copending application being incorporated herein by reference to the extent necessary to understand the construction of the sorter and use of this invention.

The slide assembly of this invention, generally designated 22, is provided for conveying disk jacket combinations D from a sorter bin into a magazine box, generally designated 24, of a magazine M. The magazine includes a frame having a bracket 23 mounted by appropriate supporting structure 25, for example a table, frame members 30 that are dependingly mounted by the bracket and mount a plate 31, and a plurality of longitudinally spaced box mounting members 32 that are mounted by the plate to extend transversely forwardly thereof. Mounting members 32 have edge portions 32a that are transversely downwardly inclined in a forward direction to removably support the adjacent transverse parts of the top perimetric flanges 33 of the boxes 24 (only one box shown). Portions of flange 33 are extended into cut-outs 32b in the mounting members to limit the forward downward transverse movement of the box in the direction of arrow 39. However the boxes can be moved a short distance in the opposite direction to clear the cut-outs and then moved upwardly in a forward direction to clear the magazine frame and slide. The bottom wall 40 of each box mounts a pole pin (stacking pin) 29 to extend at right angles thereto and to edges 32a. Pin 29 has a top conical point 29a.

Each slide 22 is transversely elongated and includes an upper portion X having a planar bottom wall 35, a planar generally rectangular flange 36 that is joined along its transverse edge 38 to the bottom wall to be trailing relative the direction of longitudinal movement (arrow 17) of the disk combination by the sorter for being discharged into a bin, and a planar, generally triangular flange 37 that is joined to the lower part of the bottom wall longitudinally opposite flange 36. Advantageously the planes of flanges 36, 37 are parallel to one another, flange 37 extending to a lower elevation than the plane of wall 35. The top slide surfaces of the bottom wall 35 and flange 36 are inclined relative to one another at an included obtuse angle, for example about 130°–160°.

Before further describing the invention it will be mentioned that the jacket shown (see FIG. 9) has opposite side edges 63, 64 with a protect notch 65 opening to edge 64, a front edge 66, a central drive opening 67, a head access slot 72, and a rear flap 68 having diagonally cut corner edges 69, 71 and a terminal edge 70 that is parallel to the front edge. With the jacket in a closed sealed condition, the jacket is square. However with the rear flap in an unbent open condition the dimension L between edges 66, 70 is greater than than the dimension T between the side edges 63, 64.

The upper longitudinal edge 35a of the bottom wall and the upper longitudinal dimension of the upper edge of flange 36 are each less then the dimension L of the jacket, while the longitudinal dimension of edge 35a is greater than the minimum longitudinal dimension of the lower part of the bottom wall 35. The longitudinal dimension of the bottom wall 35 decreases in a transverse direction away from its top edge along the length of the juncture of flange 37 to the bottom wall while the longitudinal dimension of flange 37 increases in the same direction. Thus the upper part of the bottom wall 35 is generally rectangular while the lower part is generally trapezoidal.

The lower portion Y of the slide includes a planar, generally trapezoidal bottom wall 41 that along an intermediate part of its upper longitudinal major base edge 43 is integrally joined to the lower longitudinal edge of the upper portion bottom wall along the length thereof to be coplanar with wall 35. With the leading transverse edge 44 of the rectangular part of the upper portion extending perpendicular to the direction of discharge movement (arrow 17) of the disk assembly by the sorter, the leading part 43a of edge 43 extends a small distance longitudinally forwardly of edge 44 and is transversely spaced a short distance from the lower longitudinal edge 37a of the triangular flange while the trailing part 43b of edge 43 extends longitudinally rearwardly of wall 35 (direction opposite arrow 17) to be longitudinally intermediate the transverse edges 45, 38 of flange 36 and more than half the longitudinal distance toward edge 45, and transversely spaced a short distance from the lower longitudinal edge 36a of flange 36.

Joined to the opposite transverse edges of the lower bottom wall to extend the length thereof are generally planar vertical leading and trailing side walls 50 and 51 respectively that converge toward one another in a downward direction at a relatively small angle. A flange 52 that extends the length of side wall 51 is joined thereto to have its top surface inclined relative the top surface of the lower bottom wall at about the same angle of inclination that flange 36 has relative to wall 35. The perpendicular spacing of the trailing edge 54 of flange 52 from the bottom wall 41 is substantially less than (for example about one half of) the corresponding spacing of the trailing edge 45 of flange 36 from the bottom wall 35 while the longitudinal spacing of edge 54 from a straight line extension of the juncture of flange 36 to bottom wall 35 is nearly the same as that of edge 45 from said juncture, but decreases slightly in a direction toward the end remote from wall 35.

Each of the sorter bins is of a longitudinal dimension that is slightly greater than the corresponding dimension of the slide upper portion X while the longitudinal dimension of the upper portion is greater than dimension L. The slide in a position of use has its upper longitudinal edge closely adjacent the bin end wall 11 and is of a dimension such that in the plane of the top surface of the bottom walls the spacing between the vertically extending edge 74 of the side wall of the respective bin to the adjacent edge 75 of side wall 50 at the juncture of the side wall to the lower bottom wall is less than dimension T of the jacket, but may be greater than the corresponding dimension of the flap edge 70. Further the longitudinal dimension of each of the major base edge 43 and minor base edge 76 of the lower bottom wall is less than dimension L of the jacket while the minor base longitudinal dimension is only slightly greater than dimension T. The transverse spacing of the major base edge from the minor base edge in the plane of the lower bottom wall is greater than dimension L.

In order to support the slide in a position of use it has a leg 78 dependingly joined to the upper longitudinal edge of the upper bottom wall 35. In a position of use the leg abuts against the bottom wall 12 of the sorter bin while the lower bottom wall 41 is, for example, bolted at 79 to an inclined flange 27a of the magazine bracket whereby the bottom walls 35, 41 are inclined transversely upwardly at an acute angle to the horizontal, for example about 30°. The bolts 79 are located adjacent longitudinal edge part 43b whereby the disk jacket will not contact them during normal use of the slide.

In order to prevent a disk combination overshooting a storage container after sliding off the slide there is provided a generally U-shaped bracket, generally designated 80. The bracket includes a pair of elongated legs 81 that are pivotally connected at 82 to the lower portions of side walls 50, 51 to be located on the remote sides thereof. The opposite ends of the legs are joined to the web 83. Joined to the intermediate portions of the legs are generally L-shaped flanges 85 that initially extend longitudinally remote from one another along parts 85a and then along parts 85b at right angles thereto so as in a position of use extend along the perimetric flange 33 of the respective box 24. In the bracket position of use the legs have portions 81a that may extend downwardly inside of a magazine box and extend downwardly about the same amount as parts 85b, portion 81a being located remote from the pivots 82 and joined to adjacent web portions which may also extend downwardly inside of the box. The web also extends above the legs and the box. Flange 52 is provided with a notch 87 to permit the bracket being pivoted from its use position of FIG. 1 to a retracted position that web 83 overhangs the lower portion of the lower bottom wall to facilitate the removal of a box from the magazine frame. In the position of use the spacing of the web from the lower longitudinal edge 76 of the lower bottom wall is greater than disk combination dimension L.

Preferably at least the surfaces of the slide that are engaged by the disk combinations during use are coated with a sutiable anti-friction coating.

Even though the sorter may have a number of bins and may have a slide assembly for each bin to convey disk combinations to the magazine box that is associated with each bin, use will be described with reference to only one such set of bin, slide and box. With the slide assembly in a position of use and the sorter "on", as a disk combination is moved by rollers 15, 16 with the rear flap in advance of edge 66, fingers 14 are operated to deflect the disk jacket combination to move longitudinally and downwardly in the bin (see D2 in FIG. 3). As a result of this deflection the disk combination is inclined downwardly in a longitudinal direction so that as the combination descends the jacket portion adjacent edge 69 engages the upper bottom wall 35 adjacent the bin leading side wall and the portion of the jacket adjacent the juncture of edges 63, 66 engages the upper inclined flange. Thence the jacket becomes transversely and downwardly inclined so that the upper flange sliding supports the jacket adjacent edge 66 along at least the major portion of the length thereof and the bottom wall slidingly supports the jacket adjacent edge 70 along at least the major portion of the length thereof (see D3 in FIGS. 1, 5 and 6). Due to the inclination of the upper flange, in the event edge 70 does not abut against the bin leading side wall the disk combination moves longitudinally to engage said wall. It is to be noted the longitudinal dimensions of the upper flange and bottom wall are such that at all times the jacket engages the upper portion X there is an air space between the upper portion X and a part of the jacket intermediate edges 70, 66 (see FIG. 6). As a result air can escape from between the jacket and the slide upper portion to avoid the combination floating on an air cushion and distorting the desired path of movement of the disk combination. Further at this time the disk combination is supported to be inclined longitudinally downwardly and also inclined transversely downwardly.

As the disk combination moves down the slide (arrow 39), about the time jacket edge portion 64 moves out of the bin, the jacket portion adjacent edge 71 moves into overhanging relationship to triangle flange 37. After a little more than half of the disk combination edge portion 70 moves over flange 37, the corner portion of the jacket adjacent edge 71 moves downwardly along the triangular flange to be below the plane of the top surface of the slide bottom walls and begins to rotatably swing in the direction of arrow 89.

The disk combination then continues to rotate and slide downwardly along the slide upper portion to move edge 64 (or notch 65) to abut against edge part 43a (or sometimes against edge 75 of side wall 50) adjacent jacket notch 65. At this time the jacket corner portion defined by edges 64, 66 overhangs the bottom wall 41 and is spaced therefrom (see D4 in FIG. 5). As a result of the jacket abutting against edge part 43a it retards the movement of the abutted against portion so that the jacket rapidly rotatably swings through nearly the remainder of a 90° angle from the angular position it had prior to in part overhanging the triangular flange. As the jacket so rotates edge 64 may slide along edge part 43a to abut against edge 75 of the side wall 50 and the jacket moves off the upper flange with the general longitudinal angle of inclination of the jacket relative to the plane of the bottom walls decreasing due to the relative positions of the upper and lower flanges 36,52. In the event the jacket has not been sufficiently rotated by edge 64 abutting against edge part 43a so that the jacket corner portion defined by edges 63, 66 will descend onto the lower bottom wall as the jacket moves off the upper portion, said corner portion will slidingly abut against flange 52 and an edge portion of the jacket adjacent edge 71 will abut against the side wall 50. Now as the jacket continues to slide transversely, due to the inclination of the lower flange 52 relative the lower bottom wall, the jacket rotates to be entirely between the side walls, and in parallel slidingly abutting relationship to the lower bottom wall prior to jacket edge 66 moving over the lower wall lower edge 76. Side wall 50 limits such rotation.

The disk combination in moving off the slide has edge 66 move over the top of the pole pin and then edge 66 engages the bracket web (or front side wall 93 of the box) to descend in the box with the pole pin extending through the drive openings of the disk and jacket. In the event the drive openings of the jacket and disk are not substantially concentric when the jacket edge 66 engages the web 83 (or box front wall 93) the sudden stoppage of the transverse downward movement of the jacket alone or in conjunction with the disk combination descending along the conical portion of the pole pin wil result in the disk moving in the jacket so the drive openings become substantially concentric as indicated in FIG. 9. As may be noted in FIG. 1, the box 24, including pole pin 29, are inclined downwardly at a relatively steep angle so that the disk jacket combination will descend under gravity to the bottom of the box or onto the top disk jacket combination in the box.

Although a particular magazine assembly has been referred to herein, it is to be understood the construction thereof may varied as long as the disk jacket combination in moving off the slide will have its edge 66 abut against the bracket web, a stop plate or container front wall 93 so that in the event the disk drive opening is not substantially concentric with that of the jacket the inertia of the disk will result in the disk moving relative to the jacket to a substantially concentric condition and the disk jacket combination will descnd under gravity to overlay the uppermost disk jacket combination in the container (box). Further in place of the bracket 80, a stop plate may be provided on the magazine frame or the boxes 24 to have edges 66 abut thereagainst (if they do not strike the box front wall) and then descend in the box.

It is to be understood the slide assembly can be used for directing disk jacket combinations that have their rear flaps sealed into removable storage containers to be in stacked relationship.

What is claimed is:

1. Apparatus for conveying a generally flat disk jacket combination that includes a generally rectangular jacket having opposite first and second edges and opposite third and fourth edges that extend at right angles to the first and second edges to fall into a box, comprising first means for moving the disk jacket combination in a longitudinal forward direction with the first edge in advance of the second edge and discharge the combination, second means for receiving the discharged combination from the first means and supportingly conveying the combination under gravity transversely downwardly more remote from the first means with the third edge transversely in advance of the fourth edge and the first edge forwardly of the second edge during the initial transverse downward movement, and third means for receiving the combination from the second means and supportingly conveying the combination under gravity transversely downwardly more remote from the first means to discharge the combination into the box and initially impeding the transverse movement of the jacket first and third edge corner portion to impart a turning movement to the combination so that the combination rotates through an angle of about 90° as the combination moves under gravity toward the box whereby the third edge is forwardly of the fourth edge and the second edge is transversely in advance of the first edge.

2. The apparatus of claim 1 further characterized in that each of the second and third means includes a bottom wall that is inclined generally transversely and downwardly and joined to the other, and that the third means has longitudinally leading and trailing side walls that are joined to the third means bottom wall to extend transversely and upwardly relative thereto, the longitudinal spacing of the side walls at their juncture to the third means bottom wall being slightly greater than the right angular spacing of the third edge from the fourth edge.

3. The apparatus of claim 2 further characterized in that the bottom walls have upper and lower longitudinal edges, the third means bottom wall upper edge having a terminal leading edge part transversely spaced from the second means bottom wall lower longitudinal edge, the leading side wall having a vertical extending edge transversely adjacent the lower portion bottom wall upper edge, the above impeding of the transverse movement of the jacket resulting from the third edge abutting against at least one of the leading edge part and leading side wall vertical extending edge as the disk jacket combination moves transversely downwardly.

4. The apparatus of claim 2 further characterized in that the second means includes transverse vertical wall means for stopping forward movement of the disk jacket combination that has been discharged by the first means, said wall means being forwardly of the second means bottom wall.

5. The apparatus of claim 4 further characterized in that the second means bottom wall is generally planar, extends transversely more remote from the first means than the wall means and has a transverse and downwardly extending edge that is remote from the wall means and longitudinally spaced therefrom by a dimension that is substantially less than the minimum spacing of the jacket first edge from its second edge, and that the second means includes a generally planar flange joined to the second means bottom wall along said bottom wall transverse edge to extend rearwardly thereof, said flange in planes that are perpendicular to the plane of the third means bottom wall and the direction of transverse downward inclination of the third means bottom wall extending upwardly relative the third means bottom wall at angles of inclination substantially greater than 90° and substantially less than 180°.

6. The apparatus of claim 5 further characterized in that the third means bottom wall is generally planar and coplanar with the second means bottom wall, the bottom walls having upper and lower longitudinal edges, the third means bottom wall upper longitudinal edge having an intermediate part joined to the second means bottom wall lower longitudinal edge and a leading longitudinal edge part extending forwardly of the second means bottom wall lower longitudinal edge and transversely spaced from the second means bottom wall.

7. The apparatus of claim 6 further characterized in that the third means bottom wall has opposite tranverse downwardly extending edges, that the third means includes leading and trailing side walls joined to the respective third means bottom wall transverse edge to extend thereabove and are longitudinally spaced a slightly greater distance than the right angle spacing of the jacket third and fourth edges from one another, the leading side wall having a vertically extending edge transversely adjacent the leading longitudinal edge part, the second means bottom wall and flange being inclined relative to one another and of longitudinal dimensions to slidingly support the jacket as it moves transversely downwardly to abuttingly engage at least one of said leading longitudinal edge part and the leading side wall vertical edge to provide the above mentioned impeding of transverse movement of the jacket.

8. The apparatus of claim 7 further characterized in that the wall means has opposite vertically extending first and second edges with the second edge transversely more closely adjacent the second means lower longitudinal edge than the first edge, the transverse downward dimension of the second means bottom wall from the wall means second edge to the second means bottom wall lower longitudinal edge being less than the right angle spacing of the jacket third edge from its fourth edge.

9. The apparatus of claim 7 further characterized in that the second means bottom wall has a leading transverse downwardly extending first edge part that for at least part of its length is closely adjacent the wall means and has an end adjacent but substantially transversely spaced from the third means bottom wall, and a leading second edge part that extends from the first edge part transversely downwardly in a longitudinally rearward direction to adjacent the juncture of the third means bottom wall upper longitudinal intermediate and leading edge parts, and that the second means includes a second flange that is joined to said second edge part to along at least a major portion of the length thereof extend downwardly in a longitudinally forward direction in at least nearly parallel relationship to the firest mentioned second means flange.

10. The apparatus of claim 7 further characterized in that there is provided a bracket to block a disk jacket combination moving off the third means overshooting the box, the bracket including transversely elongated legs havin one ends pivotally connected to the side walls and opposite ends, a web joined to and extending between the legs, the length of the legs between the pivot connection and the web being greater than the right angle dimension between the jacket first and second edges, and means joined to the legs for abutting against the box so that the web in the bracket in use position extends above the box, the bracket being pivotable between an in use position that the web extends to a higher elevation than the box at a location transversely remote from the bottom wall and a position above the third means bottom wall.

11. The apparatus of claim 10 wherein the jacket includes an open unbent rear flap that has the jacket first edge, the spacing of the jacket first and second edges being greater than the jacket third and fourth edges, the jacket and disk have central drive openings, and a pole pin extends upwardly in the box, further characterized in that there is provided means for mounting the box, and means connected to at least one of the bottom walls to retain the bottom walls at an angle of transverse inclination of about 30° with the lower portion lower longitudinal edge sufficiently higher than the pole pin that the combination will abut against the box remote therefrom and fall to have the pole pin extend upwardly through the the central opeings to substantially center the disk central opening relative the jacket central openings in the event the openings were not substantially centered relative one another when the combination was being slidingly conveyed by the second and third means.

12. The apparatus of claim 7 further characterized in that the third means bottom wall upper longitudinal edge has a trailing edge part that extends longitudinally rearwardly of the juncture of the second means flange and the bottom wall.

13. The apparatus of claim 12 further characterized in that the trailing side wall has a top edge that is inclined transversely downwardly in a direction away from the first means, and that the third means includes a flange joined to said top edge to be transversely downwardly inclined and also longitudinally rearwardly upwardly inclined from the trailing side wall.

14. The apparatus of claim 13 further characterized in that each of the flanges has a transversely downwardly extending trailing edge that is longitudinally rearwardly spaced from the juncture of the first mentioned flange to the second means bottom wall and that the perpendicular dimension of the second means flange trailing edge above the plane of the bottom walls is substantially greater than that of the third means flange trailing edge.

15. A slide assembly for gravitationally transversely conveying and rotating generally flat disk jacket combinations or the like through angles of about 90° relative the flat surfaces thereof from means, such as a sorter or the like, for sequentially conveying the combinations in a generally horizontal plane to store containers such as a box or the like to be stacked in generally flat vertical stacked relationship wherein the jacket has opposite first and second edges and opposite third and fourth edges that extend at right angles to the first and second edges, comprising an upper portion for receiving a disk jacket combination from the conveying means and a lower portion for discharging the disk into the storage box, the upper portion including an upper, generally planar bottom wall having opposite upper and lower longitudinal edges and opposite leading and trailing transverse edges, the maximum longitudinal spacing of the above transverse edges being less than the right angle spacing of the first and second edges, and a flange joined to the bottom wall trailing transverse edge to extend longitudinally and upwardly from the above bottom wall at an included angle substantially greater than 90°, and a lower portion that includes a generally planar bottom wall having upper and lower longitudinal edges and transverse leading and trailing edges, the lower portion leading and trailing edges at the lower portion lower longitudinal edge being spaced by a dimension slightly greater than the right angle dimension between the jacket third and fourth edges, the lower portion upper longitudinal edge having an intermediate part joined to the upper portion bottom wall lower longitudinal edge and a leading part that is transversely spaced from the upper portion bottom wall, and leading and trailing transverse side walls joined to the lower portion bottom wall leading and trailing transverse edges respectively to extend upwardly relative to the lower portion bottom wall, the leading side wall having a vertically extending edge longitudinally and transversely adjacent the said longitudinal edge leading part, said leading edge part and said wall vertically extending edge being spaced from the upper portion bottom wall to, as the combination slides off the upper portion, have the jacket third edge abut against at least one of said leading edge part and side wall vertically extending edge whereby the combination starts to rotate and rotatably swings through an angle of about 90° as the combination moves over the lower portion to have the jacket third edge forwardly of the fourth edge.

16. The apparatus of claim 15 further characterized in that the trailing side wall has an upper transverse edge, that the lower portion bottom wall upper longitudinal edge has a trailing part extending in a direction longitudinally away from adjacent the juncture of the upper portion bottom wall and flange, and that the lower portion includes a transversely extending flange joined to the trailing side wall upper edge and inclined upwardly in a direction longitudinally away from the lower portion bottom wall.

17. The apparatus of claim 16 further characterized in that the bottom walls have top surfaces, and that the flanges in a longitudinal direction extend about the same distance rearwardly of the juncture of the upper portion bottom wall and flange, and in directions perpendicular to the top surfaces of the bottom walls the upper portion flange extends further upwardly than the lower portion flange.

18. The apparatus of claim 15 further characterized in that the upper portion bottom wall leading edge has an end which is most closely adjacent the lower portion that is spaced a substantial distance from the lower portion and that the upper portion bottom wall has an inclined edge that extends transversely and longitudinally rearwardly from adjacent said end to adjacent the upper portion bottom wall lower longitudinal edge.

19. The apparatus of claim 18 further characterized in that the upper portion includes a second flange that is joined to said inclined edge to be substantially coplanar with the first mentioned upper portion flange.

20. The apparatus of claim 18 further characterized in that there is provided a bracket having transversely elongated legs that have one ends and opposite ends and a web extending longitudinally between and joined to the legs opposite ends that is of a longitudinal length greater than the right angle dimension between the third and fourth edges, and means for pivotally connecting the legs one ends to the lower portion adjacent the lower portion bottom wall lower edge for movement between a disk jacket combination stop position that the web is longitudinally spaced from the lower portion bottom wall lower edge by a distance greater than the first and second jacket edges and a position extending above the lower portion bottom wall, and means connected to at least one of the bottom walls for supporting the bottom walls in a transversely inclined condition with the upper portion extending to a higher elevation than the lower portion.

* * * * *